US009818104B1

(12) United States Patent
Katzer et al.

(10) Patent No.: US 9,818,104 B1
(45) Date of Patent: Nov. 14, 2017

(54) SECURE ONLINE CREDIT CARD TRANSACTIONS

(71) Applicant: Sprint Communications Company L.P., Overland Park, KS (US)

(72) Inventors: Robin Dale Katzer, Olathe, KS (US); Hemant V. Tiwari, Overland Park, KS (US)

(73) Assignee: SPRINT COMMUNICATIONS COMPANY L.P., Overland Park, KS (US)

( * ) Notice: Subject to any disclaimer, the term of this patent is extended or adjusted under 35 U.S.C. 154(b) by 251 days.

(21) Appl. No.: 13/750,831

(22) Filed: Jan. 25, 2013

(51) Int. Cl.
*G06Q 20/40* (2012.01)
*G06Q 20/32* (2012.01)

(52) U.S. Cl.
CPC ........ *G06Q 20/322* (2013.01); *G06Q 20/40* (2013.01)

(58) Field of Classification Search
None
See application file for complete search history.

(56) References Cited

U.S. PATENT DOCUMENTS

| | | | |
|---|---|---|---|
| 6,314,409 B2 | 11/2001 | Schneck et al. | |
| 6,490,601 B1 | 12/2002 | Markus et al. | |
| 6,732,919 B2 | 5/2004 | Macklin et al. | |
| 6,886,741 B1 | 5/2005 | Salveson | |
| 7,043,230 B1 | 5/2006 | Geddes et al. | |
| 7,142,840 B1 | 11/2006 | Geddes et al. | |
| 7,275,105 B2 | 9/2007 | Bloch et al. | |
| 7,376,839 B2 | 5/2008 | Carta et al. | |
| 7,413,113 B1 | 8/2008 | Zhu | |
| 7,494,058 B2 | 2/2009 | Bonalle et al. | |
| 7,546,266 B2 | 6/2009 | Beirne et al. | |
| 7,575,177 B2 | 8/2009 | Killian et al. | |
| 7,637,425 B2 | 12/2009 | Mock et al. | |
| 7,644,859 B1 | 1/2010 | Zhu | |
| 7,853,782 B1 | 12/2010 | Geddes | |
| 7,926,714 B1 | 4/2011 | Zhu | |
| 7,988,060 B2 | 8/2011 | Killian et al. | |
| 7,996,324 B2 | 8/2011 | Bishop et al. | |
| 8,123,128 B1 | 2/2012 | Zhu | |
| 8,249,524 B2 | 8/2012 | Darwhekar et al. | |
| 8,401,904 B1 | 3/2013 | Simakov et al. | |
| 8,566,168 B1 * | 10/2013 | Bierbaum | G06Q 20/20 455/558 |
| 8,577,731 B1 | 11/2013 | Cope et al. | |

(Continued)

OTHER PUBLICATIONS

FAIPP Pre-Interview Communication dated Mar. 20, 2014, U.S. Appl. No. 13/482,731, filed May 29, 2012.

(Continued)

*Primary Examiner* — Lindsay M Maguire
*Assistant Examiner* — Ambreen A Alladin

(57) ABSTRACT

Embodiments relate generally to systems and methods for enabling and/or completing secure online credit card transactions. Transactions may involve the use of mobile devices wherein credit card information may be stored on the mobile device. The credit card information may be accessed and used to generate proxy credit card information, wherein the proxy information may be communicated during a transaction. The proxy credit card information may be generated by an application on the mobile device and may be communicated to and/or generated by the issuer/network of the original credit card.

16 Claims, 7 Drawing Sheets

(56) References Cited

U.S. PATENT DOCUMENTS

| | | | |
|---|---|---|---|
| 8,594,563 | B2 | 11/2013 | Waters et al. |
| 8,862,181 | B1 | 10/2014 | Cope et al. |
| 8,909,139 | B2 | 12/2014 | Aldana et al. |
| 8,983,374 | B2 | 3/2015 | Wiley |
| 9,420,403 | B1 | 8/2016 | Annan et al. |
| 2002/0038258 | A1 | 3/2002 | Inoue et al. |
| 2003/0126094 | A1 | 7/2003 | Fisher et al. |
| 2004/0010462 | A1* | 1/2004 | Moon .................... G06Q 20/04 705/39 |
| 2004/0218741 | A1 | 11/2004 | Welton |
| 2004/0260647 | A1 | 12/2004 | Blinn et al. |
| 2006/0218635 | A1 | 9/2006 | Kramer et al. |
| 2006/0237528 | A1 | 10/2006 | Bishop et al. |
| 2006/0261949 | A1 | 11/2006 | Kim et al. |
| 2007/0055785 | A1 | 3/2007 | Stevens |
| 2008/0165006 | A1 | 7/2008 | Phillips |
| 2009/0055278 | A1 | 2/2009 | Nemani |
| 2009/0182634 | A1 | 7/2009 | Park et al. |
| 2010/0185545 | A1* | 7/2010 | Royyuru ................ G06Q 20/04 705/67 |
| 2011/0165836 | A1 | 7/2011 | Dixon et al. |
| 2011/0184867 | A1* | 7/2011 | Varadarajan ........... G06Q 20/04 705/44 |
| 2011/0237296 | A1 | 9/2011 | Coppinger |
| 2011/0251892 | A1 | 10/2011 | Laracey |
| 2012/0108296 | A1 | 5/2012 | Coppinger |
| 2012/0123935 | A1* | 5/2012 | Brudnicki .............. G06Q 20/20 705/41 |
| 2012/0203701 | A1 | 8/2012 | Ayuso de Paul |
| 2013/0159186 | A1 | 6/2013 | Burdnicki et al. |
| 2013/0305333 | A1 | 11/2013 | Katzer et al. |

OTHER PUBLICATIONS

Office Action dated Mar. 18, 2010, U.S. Appl. No. 11/866,410, filed Oct. 2, 2007.
Final Office Action dated Aug. 31, 2010, U.S. Appl. No. 11/866,410, filed Oct. 2, 2007.
Restriction Requirement dated May 8, 2014, U.S. Appl. No. 11/866,410, filed Oct. 2, 2007.
Office Action dated Oct. 15, 2014, U.S. Appl. No. 11/866,410, filed Oct. 2, 2007.
FAIPP Pre-Interview dated Dec. 24, 2014, U.S. Appl. No. 13/363,369, filed Jan. 31, 2012.
Kater, Robin Dale, et al., "Providing Secure Access to Smart Card Applications", U.S. Appl. No. 11/866,410, filed Oct. 2, 2007.
Annan, Brandon C., et al., "Remote Deactivation of Near Field Communication Functionality," U.S. Appl. No. 13/363,369, filed Jan. 31, 2012.
Office Action dated Oct. 12, 2006; U.S. Appl. No. 10/901,630, filed Jul. 28, 2004.
Office Action dated Apr. 5, 2007; U.S. Appl. No. 10/901,630, filed Jul. 28, 2004.
Office Action dated Oct. 9, 2007; U.S. Appl. No. 10/901,630, filed Jul. 28, 2004.
Notice of Allowance dated Apr. 8, 2008; U.S. Appl. No. 10/901,630, filed Jul. 28, 2004.
Office Action dated Apr. 16, 2009; U.S. Appl. No. 12/172,813, filed Jul. 14, 2008.
Notice of Allowance dated Sep. 9, 2009; U.S. Appl. No. 12/172,813, filed Jul. 14, 2008.
Office Action dated Aug. 20, 2010; U.S. Appl. No. 12/631,372, filed Dec. 4, 2009.
Notice of Allowance dated Dec. 14, 2010; U.S. Appl. No. 12/631,372, filed Dec. 4, 2009.
Office Action dated Jul. 7, 2011; U.S. Appl. No. 13/045,306, filed Mar. 10, 2010.
Notice of Allowance dated Oct. 27, 2011; U.S. Appl. No. 13/045,306, filed Mar. 10, 2010.
Office Action dated Mar. 5, 2012; U.S. Appl. No. 13/250,611, filed Sep. 30, 2011.
Final Office Action dated Oct. 5, 2012, U.S. Appl. No. 13/250,611, filed Sep. 30, 2011.
Advisory Action dated Dec. 19, 2012, U.S. Appl. No. 13/250,611, filed Sep. 30, 2011.
Notice of Allowance dated Jun. 21, 2013, U.S. Appl. No. 13/250,611, filed Sep. 30, 2011.
FAIPP Pre-Interview Communication dated Nov. 20, 2012, U.S. Appl. No. 13/344,096, filed Jan. 5, 2012.
FAIPP Office Action dated Jan. 31, 2013, U.S. Appl. No. 13/344,096, filed Jan. 5, 2012.
Notice of Allowance dated Jun. 11, 2013, U.S. Appl. No. 13/344,096, filed Jan. 5, 2012.
Cope, Warren B., et al., "Method of Transaction Processing to Support Proxy Financial Card", filed Sep. 30, 2011, U.S. Appl. No. 13/250,611.
Bierbaum, Christopher J, et al., "Electronic Payment Using a Proxy Account Number Stored in a Secure Element," filed Jan. 5, 2012, U.S. Appl. No. 13/344,096.
Cope, Warren B., et al., "Electronic Purchase Transaction Trust Infrastructure", filed May 29, 2012, U.S. Appl. No. 13/482,731.
Ching, Andrew T., et al., "Payment Card Rewards Programs and Consumer Payment Choice", Journal of Banking & Finance, vol. 34, Issue 8, Aug. 2010, pp. 1773-1787, ISSN 0378-4266, http://dx.doi.org/10.1016/j.jbankfin.2010.03.015.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Notice of Allowance dated May 27, 2014, U.S. Appl. No. 13/482,731, filed May 29, 2012.
Office Action dated Mar. 31, 2015, U.S. Appl. No. 13/363,369, filed Jan. 31, 2012.
Final Office Action dated Jun. 23, 2015, U.S. Appl. No. 11/866,410, filed Oct. 2, 2007.
Office Action dated Sep. 1, 2015, U.S. Appl. No. 13/363,369, filed Jan. 31, 2012.
Notice of Allowance dated Apr. 18, 2016, U.S. Appl. No. 13/363,369, filed Jan. 31, 2012.
Final Office Action dated Feb. 10, 2016, U.S. Appl. No. 13/363,369, filed Jan. 31, 2012.
Office Action dated Jun. 27, 2017, U.S. Appl. No. 11/866,410, filed Oct. 2, 2007.

* cited by examiner

SECURE ONLINE CREDIT CARD TRANSACTIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices may access resources such as the Internet to perform a variety of transactions that may include online purchases of goods and/or services. In the course of paying for such goods and/or services, the mobile device user may provide payment information such as credit card account information, which may include names, dates, numbers, addresses, as well as other information associated with the owner/user of the credit card. This information may be of a private nature such that security measures to avoid theft or fraud may be desirable.

SUMMARY

In an embodiment, a method of completing a transaction using proxy credit card information is disclosed. The method comprises: initiating a transaction with a merchant or payee on a mobile device; generating proxy credit card information based on original credit card information using an application on the mobile device; creating at least one usage rule associated with the use of the proxy credit card information, wherein the at least one usage rule limits the use of the proxy credit card information to the one merchant or payee; communicating the proxy credit card information and at least one usage rule to an issuer of the credit card; and feeding the proxy credit card information into the payment transaction.

In an embodiment, a method of completing a transaction using proxy credit card information is disclosed. The method comprises: initiating a transaction; creating proxy credit card information using an application on a mobile device; creating at least one usage rule associated with the use of the proxy credit card information, wherein the at least one usage rule comprises one of: purchase amount limit, number of uses limit, or frequency of use limit; communicating the proxy credit card information and the at least one usage rule to an issuer of the credit card; and using the proxy credit card information to complete the transaction.

In an embodiment, a method for creating proxy credit card information is disclosed. The method comprises accessing original credit card information stored in a secure element on a mobile device; generating proxy credit card information based on the stored original credit card information; and creating at least one usage rule associated with use of the proxy credit card information, wherein credit card information comprises numbers, names, expiration dates, security codes, or issuer information associated with the credit card.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
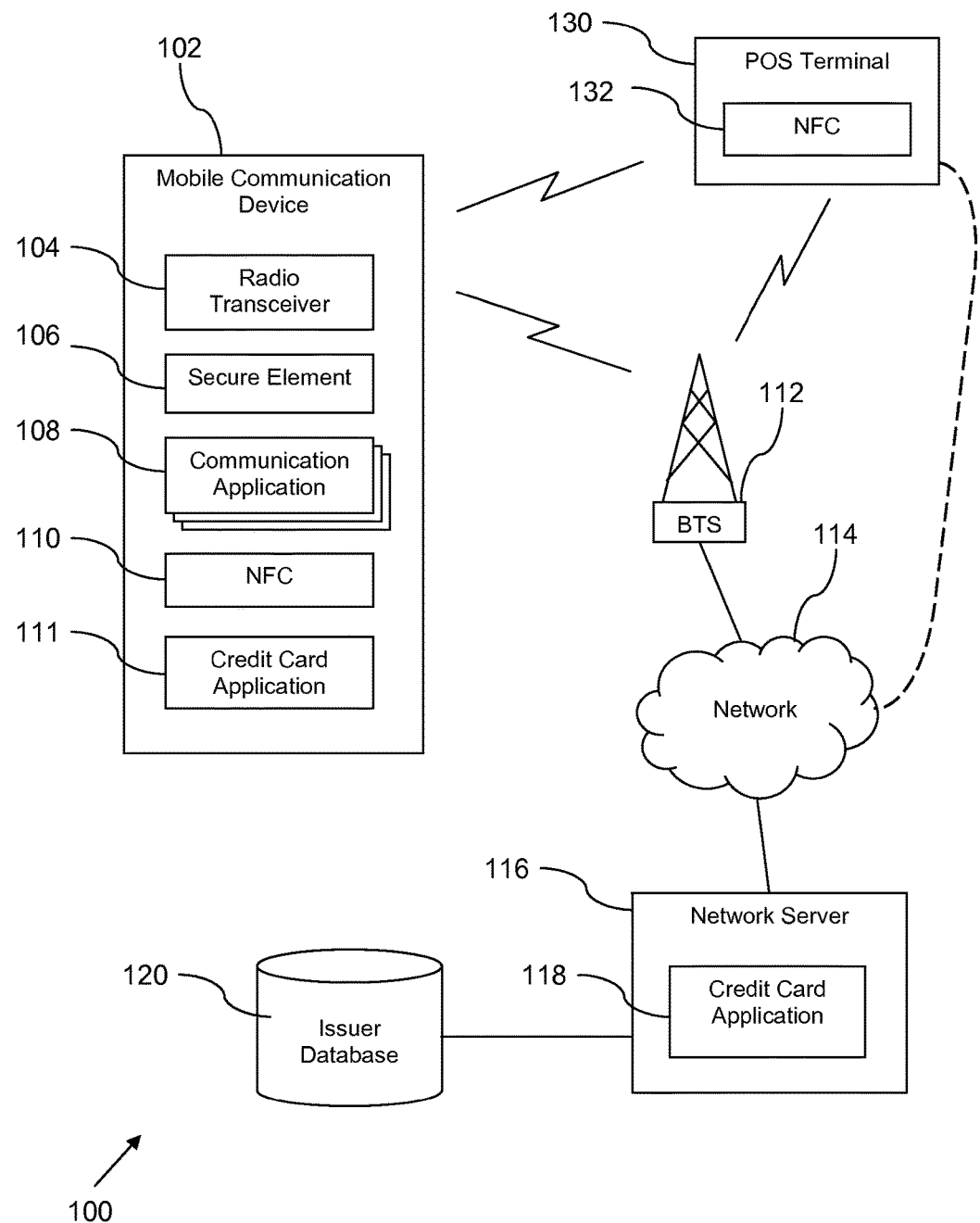
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for completing and/or enabling secure online credit card transactions. In some cases the transactions may be completed using a mobile device, wherein the mobile device may communicate credit card information during a transaction. In some embodiments, a mobile device may access the Internet to complete an online transaction. In other embodiments, a mobile device may be enabled to communicate credit card information with a point of sale (POS) terminal via near field communication (NFC), wherein the mobile device and the point of sale terminal may be NFC-enabled. In yet other embodiments, a transaction may be completed using a device separate from the mobile device such as a computer, for example.

The use of proxy credit card information (created based on original credit card information) may provide protection for a user's original credit card information. For example, if the proxy credit card information is used in an online transaction and then the proxy credit card information is stolen, the original credit card information would be protected, and the usage rules associated with the proxy credit card information may prevent unwanted transactions from occurring. The use of the proxy credit card information may protect the user from losing (and therefore possibly having to cancel) their original credit card, and it may protect the issuer or network of the original credit card from unwanted transactions that the issuer or network may not be able to charge to the user. The use of the proxy credit card information may reduce the fraud exposure of the issuer, for example may limit the fraud exposure to a limited period of time, to a limited number of transactions, and/or to a limited number of merchants.

To provide security for transactions completed as described above, a mobile device may comprise an application operable to create the proxy credit card information based on original credit card information. There may exist a relationship between the proxy credit card information and the original credit card information, wherein the relationship may be recognizable by multiple parties such as the user and the issuer of the card. In an embodiment, a portion of the original credit card information may remain unchanged in the proxy credit card information. The original credit card information may, in some cases, be stored in a secure element within the mobile device, where the application may access the information stored in the secure element. The proxy credit card information may be communicated during a transaction so that the original credit card information is protected from theft or fraud. The proxy credit card information may be communicated to the issuer and/or network of the original credit card information so that transactions completed using proxy credit card information may be associated with the owner/user of the original credit card information.

In some cases, the proxy credit card information may be generated by an application on a mobile device and then communicated from the mobile device to a server/database of the issuer/network of the original credit card. Alternatively, the issuer/networker may receive indication from the mobile device that proxy credit card information has been generated and may also generate the proxy credit card information in a similar fashion as the application on the mobile device. By receiving and/or generating the proxy credit card information, the issuer/network may associate the proxy credit card information with the correct owner/user of the original credit card information. The proxy credit card information may be generated (by the mobile device and/or the issuer/network of the credit card) using an algorithm, wherein at least part of the credit card information may be changed and the changes may, in some cases, be made based on a predefined pattern or method. Credit card information may comprise numbers, names, expiration dates, security codes, and/or issuer information associated with the credit card. Additionally, one or more usage rules may be created and associated with the proxy credit card information, wherein the usage rules may define how the proxy credit card information may be used. Usage rules may comprise purchase amount limit, number of uses limit, frequency of use limit, time limit, and/or merchant specification. Additionally, usage rules may comprise a specification of (or limitation for) the type of merchant and/or type of goods bought, such as gas stations, groceries, or auto repairs, for example.

Turning now to FIG. 1, a communication system 100 is described. In an embodiment, the system 100 may comprise a mobile communication device 102. The mobile device 102 may comprise a radio transceiver 104, a secure element 106, a plurality of communication applications 108, a near field communication (NFC) transceiver 110, and an optional credit card application 111. The mobile device 102 may be configured to use the radio transceiver 104 to establish a wireless communication link with a base transceiver station (BTS) 112, and the base transceiver station 112 may provide communications connectivity of the device 102 to a network 114. The network 114 may comprise any combination of private and public networks. The base transceiver station 112 may also be known as a cell tower.

It is understood that the system 100 may comprise any number of mobile communication devices 102 and any number of base transceiver stations 112. The collectivity of base transceiver stations 112 may be said to comprise a radio access network, in that these base transceiver stations 112 may provide radio communication links to the mobile communication devices 102 to provide access to the network 114. The radio access network may be abstracted in different ways and may comprise, in addition to the base transceiver stations 112, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The radio transceiver 104 may be in communication with the base transceiver station 112 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The device 102 may be any of a mobile phone, a personal digital assistant (PDA), a media player, a wireless enabled computer, a tablet, or other mobile communication device. In an embodiment, the mobile communication device 102 may have other components (not shown) such as a near field communication (NFC) radio transceiver, a wireless local area network (WLAN) radio transceiver, or other components.

The communication applications 108 may comprise a voice communication application, a data communication application, a web browser application, an email application, a short message system (SMS) or texting application, a multimedia message system (MMS) application, and other communication applications. The communication applications 108 may be standard communication applications that are delivered by an original equipment manufacturer (OEM) who assembles the mobile communication device 102. The communication applications 108 may be stored as firmware or software in a memory area of the mobile communication device 102. The communication applications 108 may expose application programming interfaces (APIs) accessible to other applications to provide wireless communication functionality to the other applications.

The secure element 106 of the mobile device 102 may be operable to store information (such as credit card information, loyalty card information, and/or coupons, for example) in a secure fashion, wherein the information may be accessed by a user of the mobile device. Additionally, a user may allow (or enable) one or more applications on the mobile device to access the information stored in the secure element 106, wherein the secure element 106 may be operable to store and/or execute applications. The secure element 106 may comprise a chip or chipset which may be installed or embedded on a mobile device 102 by a service provider and/or an original equipment manufacturer (OEM). The secure element 106 may comprise an environment in which application code and application data may be securely stored and administered and in which secure execution of applications may occur. The secure element 106 may provide security for transactions completed via a near field communication (NFC) enabled application 110, wherein personal information may be kept secure during the transaction.

The NFC transceiver 110 may be embedded in the mobile device 102 and enable the mobile device to communicate with other NFC-enabled devices. An NFC-enabled device may include point-of-sale (POS) terminals 130, for example, wherein the point-of-sale terminal 130 may comprise an NFC transceiver 132 as well. In an embodiment, the mobile device 102 may communicate purchase information to the point-of-sale terminal 130 via the NFC transceivers 110 and 132 during a transaction. The point-of-sale terminal 130 may be operable to communicate with a network 114, wherein the point-of-sale terminal may comprise a transceiver operable to allow communication via a base transceiver station 112 or alternatively may communicate with the network 114 via a wired connection.

In an embodiment, the credit card application 111 of the mobile device 102 may be stored and/or executed by the secure element 106. The credit card application 111 may be operable to access credit card information, wherein the credit card information may be stored in the secure element 106, and create proxy credit card information based on the original credit card information. Alternatively the credit card information may be stored in a cloud, wherein the cloud may comprise memory controlled by the network 114 or network server 116. The use of proxy credit card information for a transaction may allow for additionally security, particularly for online transactions. In an embodiment, the proxy credit card information may be generated based on the original credit card information using an algorithm or similar process. The credit card application 111 may be installed or embedded on a mobile device 102 by the user of the mobile device, a service provider, a credit card issuer, and/or an original equipment manufacturer (OEM). The credit card application 111 may also communicate with the issuer of the original credit card, wherein an issuer database 120 may store credit card information. In an embodiment, one or more usage rules may be created that are associated with the use of the proxy credit card information. Usage rules may comprise purchase amount limit, number of uses limit, frequency of use limit, time limit, and/or merchant specification.

In an embodiment, the proxy credit card information may be created using an algorithm based on the original credit card information, wherein the final proxy credit card number may satisfy Luhn's algorithm. In some embodiments, the proxy credit card number created by the application 111 may not satisfy Luhn's algorithm, wherein some payment systems may comprise a check to eliminate the use of false numbers. Therefore, the proxy credit card number may be altered to satisfy Luhn's algorithm before use in a transaction. Additionally, the proxy credit card information may contain some portions of the credit card number that may be unchanged from the original credit card information, for example a first four digits or a first six digits of a sixteen digit number of the original credit card number. This may allow for identification of the original credit card information by an issuer of the credit card, and may also allow for correct routing to the issuer and/or network associated with the original credit card. For example, one or more of the first six digits of the credit card number may remain unchanged, as those are typically the digits associated with the issuer and or network of the card. In some embodiments, the process of generating proxy credit card information may be repeated for use in multiple transactions, wherein the algorithm used to generate the proxy credit card information may change on a rotational basis. For example, a pattern may be used to generate consecutive proxy credit card numbers (or information) wherein the pattern may be known by both the application 111 on the mobile device 102 as well as the application 118 executed by the network server 116.

In an embodiment, a user may initiate a transaction, wherein the transaction may be completed on a mobile device 102, at a POS terminal 130, or on another device such as a computer, for example. The user may then open the credit card application 111, wherein the application 111 may access original credit card information from the secure element 106 and generate proxy credit card information based on the original credit card information. In an embodiment, the credit card application 111 may be operable to auto-fill the proxy credit card information into a transaction, eliminating the need for the user to type in the full proxy credit card information using the mobile device 102. Additionally, usage rules may be created and associated with the proxy credit card information, wherein the usage rules may be based on user input. For example, a user may specify a purchase amount limit for the proxy credit card information, wherein a purchase over the limit may be denied. Additionally, a user may specify a limit for the number of uses for the proxy credit card information, wherein any transactions exceeding the limit may be denied.

For example, a user may specify a maximum of two uses of the proxy credit card information, a maximum of four uses of the proxy credit card information, a maximum of six uses of the proxy credit card information, a maximum of twenty uses of the proxy credit card information, or some other relatively small maximum number of uses of the proxy card information. Also, a user may specify a maximum frequency of use for the proxy credit card information, such as monthly, annually, etc., where a usage of the proxy credit card information outside of the specified frequency may be denied. Additionally, a user may specify a specific merchant or business that may conduct a transaction using the proxy credit card information, wherein any use of the proxy credit card information at a different merchant or business may be denied. A user may also specify a time limit for use of the proxy credit card information, such as 2 hours, 6 hours, 24 hours, 2 days, for example, wherein after the time limit has past, the proxy credit card information may not be valid and may be denied. In an embodiment, a user may choose a merchant, input the name of a merchant, or may specify the merchant that first completes a transaction with the proxy credit card information.

It is understood that the user may invoke one or more methods of the credit card application 111 to generate the proxy credit card information and/or to define the usage rules described above. Additionally, the user may invoke the method or methods of the credit card application 111 again to generate a new proxy credit card information set that is new and/or different from the previous proxy credit card information but again is deterministically related to the original credit card number by the generation algorithm and/or to generate new usage rules. In an embodiment, when new proxy credit card information is generated, the previous proxy credit card information is deleted from the secure element 106. Alternatively, in an embodiment, when new proxy credit card information is generated, the previous proxy credit card information may remain stored and active in the secure element 106, still subject to the usage restrictions associated with that previous proxy credit card information. The credit card application 111 may provide an interface that allows a user to select one of a plurality of proxy credit card information sets stored in the secure element 106 to be active on the mobile device 102 at one time, for example in association with providing a personal identification number (PIN) or other secure token to qualify the selection. This behavior may promote a parent providing access of different children to different usage rules of different proxy credit card information sets or an employer providing access of different employees to different usage rules of different proxy credit card information sets. When a first child or employee is to use the mobile device 102 for payment transactions, the parent or employer may enter the PIN or other secure token and activate a first set of proxy credit card information; when a second child or employee is to use the mobile device 102 for payment transactions, the parent or employer may enter the PIN or other secure token and activate a second set of proxy credit card information.

The proxy credit card information as well as the associated usage rules may be communicated to the issuer of the credit card, wherein the issuer may associate the proxy credit card information with the original credit card information (and therefore the user of the original credit card information) and may also enforce the usage rules associated with the proxy credit card information. Alternatively, the credit card application 111 may only communicate an indication that proxy credit card information has been created, wherein a server 116 associated with the issuer may comprise a credit card application 118 similar to the credit card application 111 of the mobile device 102 operable to generate the same proxy credit card information as the credit card application 111. Additionally, default usage rules (or settings for the usage rules) may be used wherein the default usage rules may be known by the issuer server 116 and may not be communicated from the mobile device 102 to the network server 116.

Figure 2:
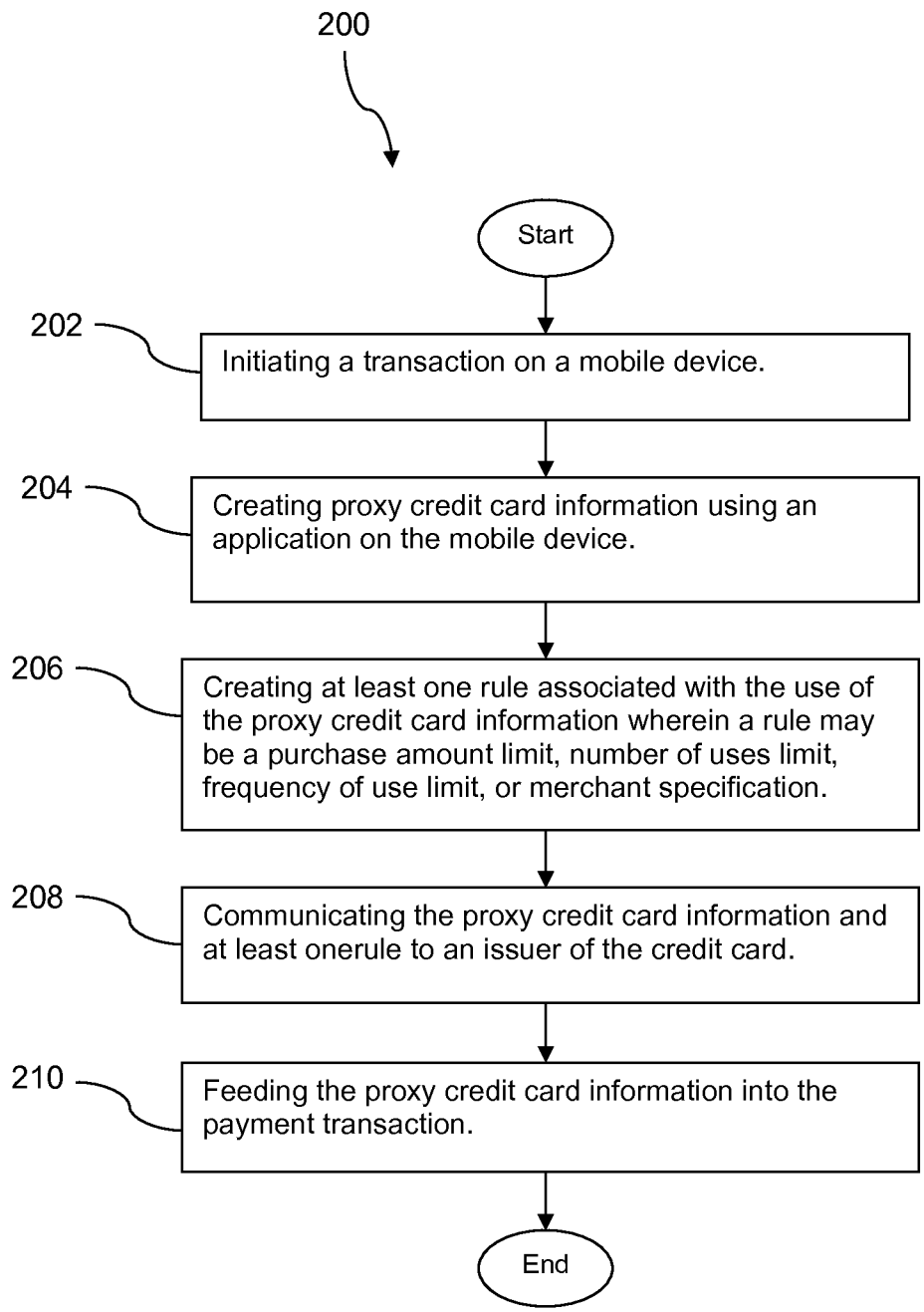
FIG. 2 is a flow chart illustrating a method according to an embodiment of the disclosure.

FIG. 2 illustrates a method 200 according to an embodiment of the disclosure. The method 200 comprises initiating a transaction using a mobile device, at block 202, wherein the transaction may be completed in part by the mobile device. At block 204, the method comprises creating proxy credit card information using an application on the mobile device, wherein credit card information may comprise one or more of numbers, dates, codes, names, addresses, and/or issuer information associated with the credit card. At block 206, the method comprises creating at least one usage rule associated with the use of the proxy credit card information wherein a usage rule may comprise a purchase amount limit, number of uses limit, frequency of use limit, time limit or merchant specification. At block 208, the method may further comprise communicating the proxy credit card information and at least one usage rule to an issuer of the credit card. In an embodiment, the steps at blocks 204, 206 and 208 may proceed the initiation of a transaction at block 202. At block 210, the method may further comprise feeding the proxy credit card information into the payment transaction, wherein the payment transaction may comprise an NFC transaction, an online merchant transaction, or other similar transaction interface. In an embodiment, the proxy credit card information may be automatically fed into the payment transaction by the application on the mobile device. Alternatively, the proxy credit card information may be manually fed into the payment transaction by the user of the mobile device.

Figure 3:
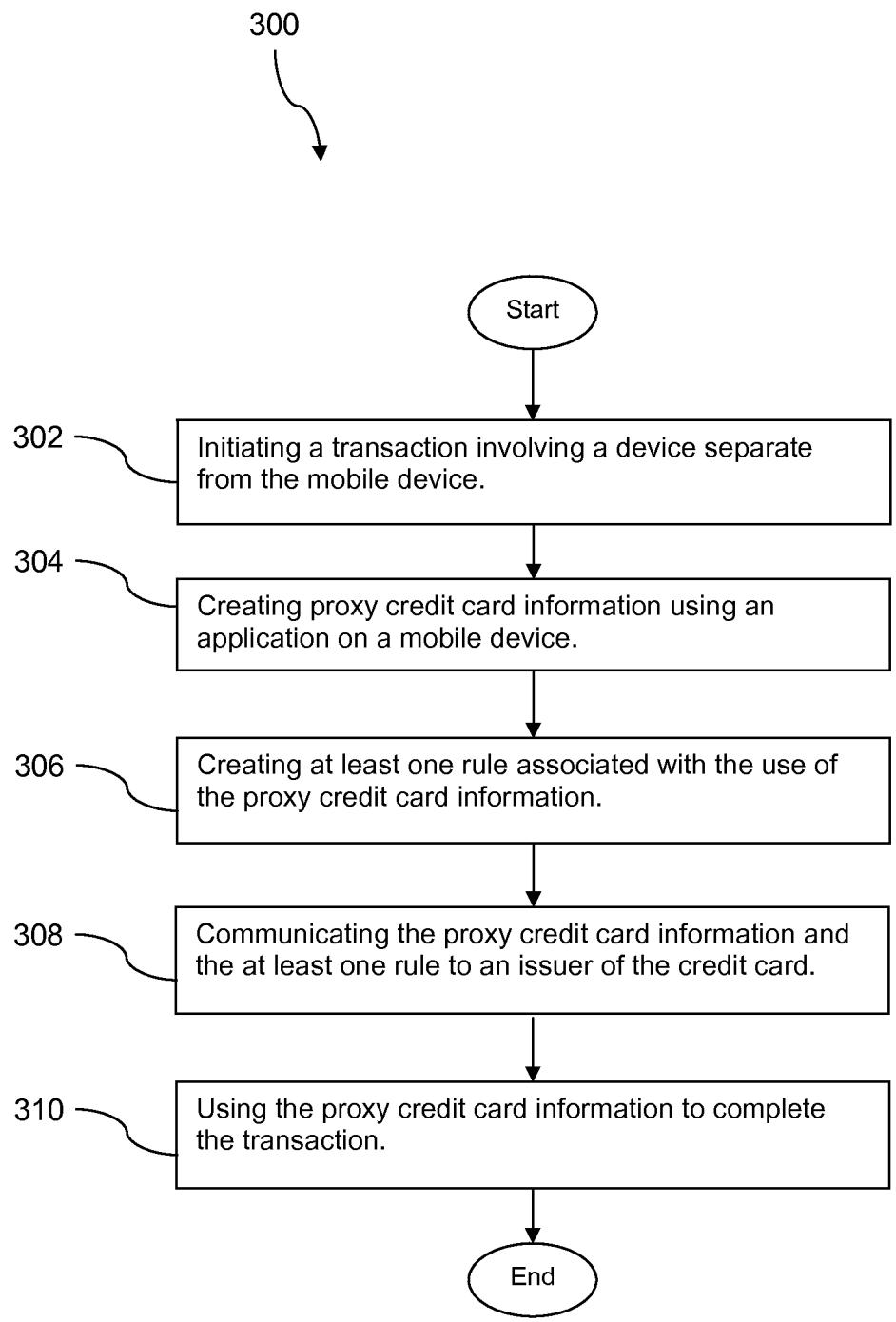
FIG. 3 is a flow chart illustrating another method according to an embodiment of the disclosure.

FIG. 3 illustrates a method 300 according to an embodiment of the disclosure. The method 300 may comprise initiating a transaction involving a device which may be separate from the mobile device, at block 302. At block 304, the method may comprise creating proxy credit card information using an application on the mobile device, wherein the proxy credit card information may be based on original credit card information stored in the mobile device. In an embodiment, the original credit card information may be stored in a secure element on the mobile device, and credit card information may comprise any numbers, dates, codes, names, addresses, and/or issuer information associated with the credit card. At block 306, the method may comprise creating at least one usage rule associated with the use of the proxy credit card information, wherein a usage rule may comprise a purchase amount limit, number of uses limit, frequency of use limit, time limit or merchant specification. At block 308, the method may comprise communicating the proxy credit card information and the at least one usage rule to an issuer of the credit card. In some embodiments, the above mentioned steps may be completed in a different order than described. For example, the initiation of a transaction at block 302 may occur after block 306 or 308. At block 310, the method may further comprise using the proxy credit card information to complete the transaction. In an embodiment, the transaction may be completed by a device separate from the mobile device, wherein the device may communicate with the issuer of the credit card to verify the information. In an embodiment, the issuer may verify the proxy credit card information after receiving the proxy information from the mobile device. In an alternative embodiment, the issuer may generate the proxy credit card information based on communication with the mobile device. In an embodiment, the device on which the transaction is completed may comprise a point of sale (POS) terminal and/or an online store or merchant, wherein completing the transaction may comprise communicating the proxy credit card information to the device via user input and/or near field communication (NFC).

Figure 4:
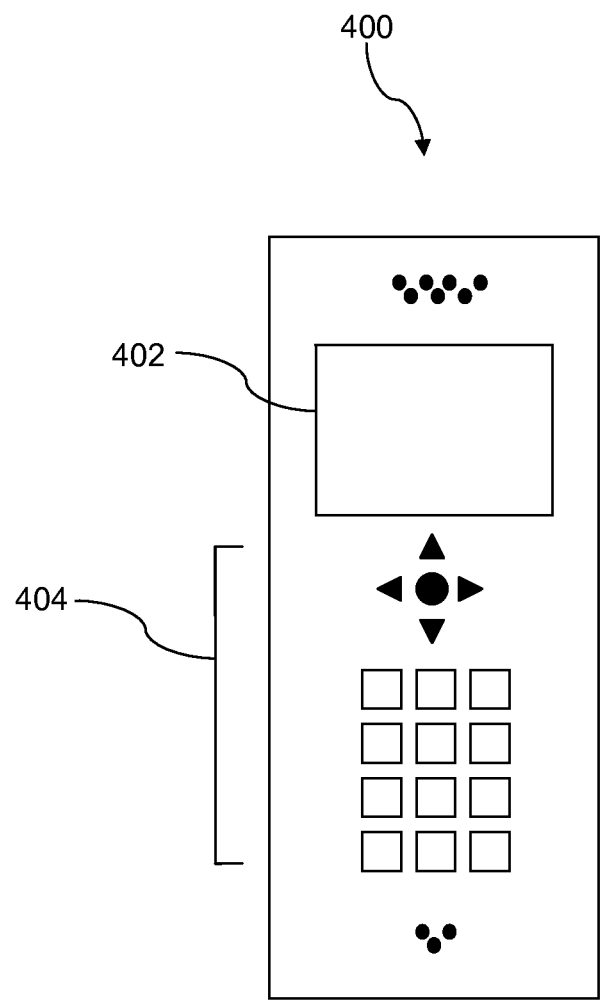
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
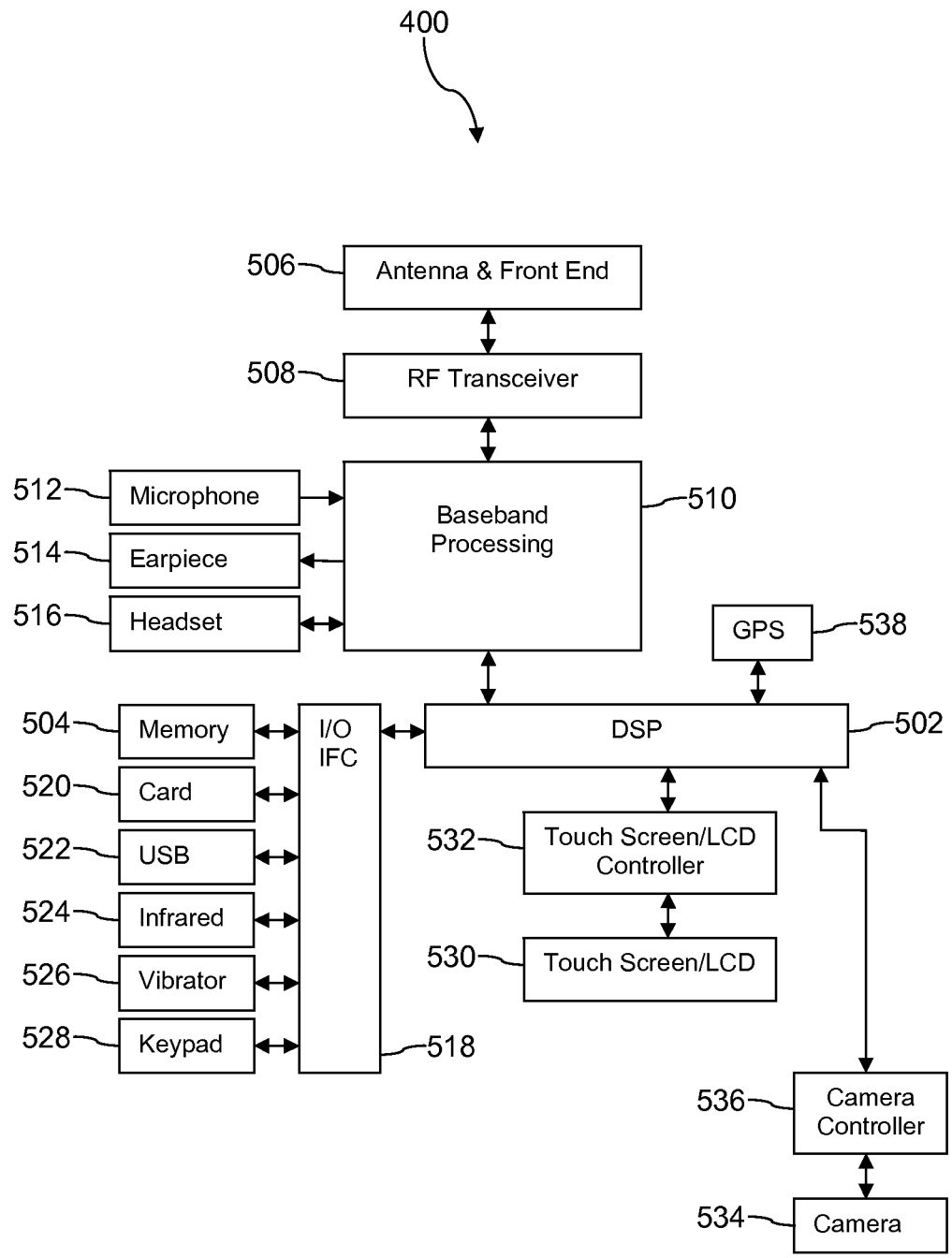
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
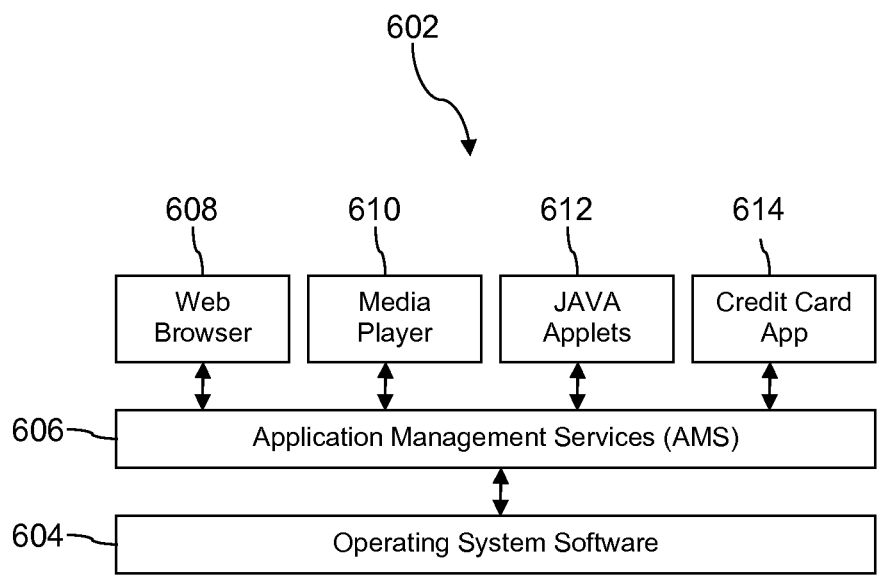
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612, and a credit card (CC) application 614. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The credit application 614 may be substantially similar to the embodiments described above with reference to the credit card applications 111 and 118 of FIG. 1.

Figure 6B:
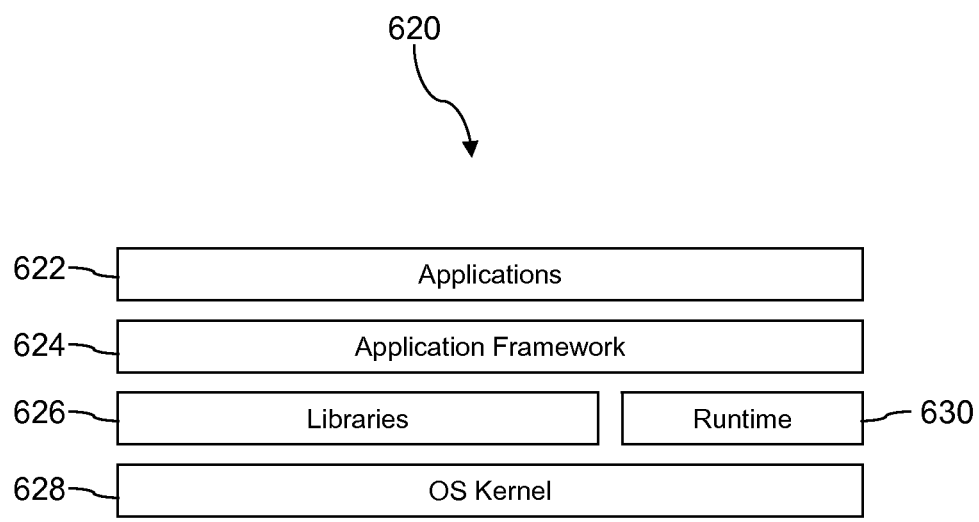
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
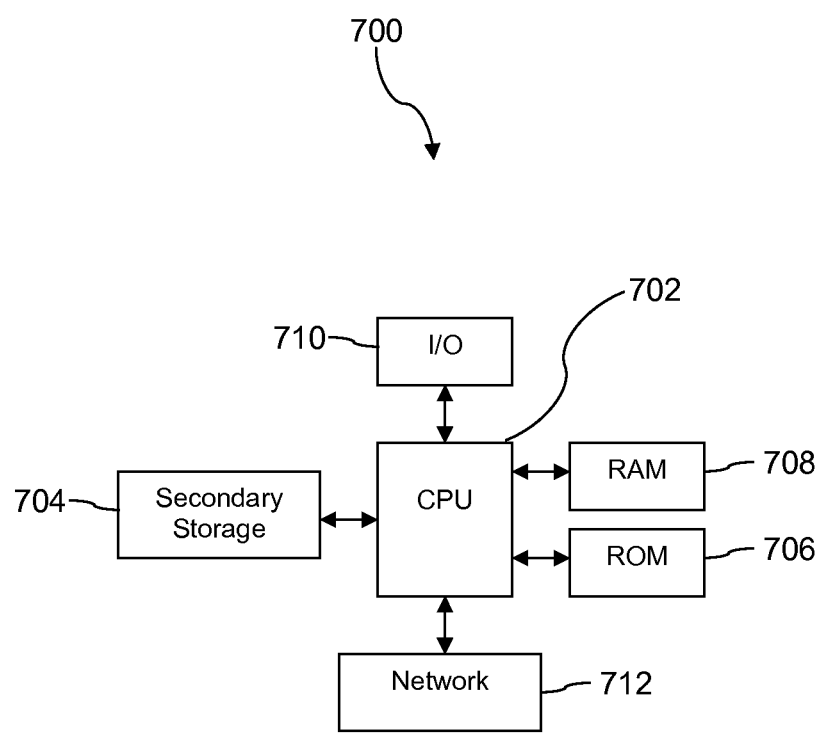
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of completing a transaction using proxy credit card information comprising:

initiating, via a radio transceiver of a mobile device, a transaction with a computer system associated with a merchant or payee;

generating, in a secure element of the mobile device comprising a non-transitory memory and by executing an application that configures a processor of the mobile device to execute a mobile device algorithm, proxy credit card information based on original credit card information stored in the non-transitory memory of the secure element on the mobile device, wherein the proxy credit card information comprises a proxy credit card number that is different from the original credit card information, and wherein the secure element comprises a chip embedded on the mobile device that provides security during the transaction;

receiving, via an interface on the mobile device, user input which defines at least one usage rule that limits use of the proxy credit card information to the merchant or payee;

in response to the generating and the receiving, creating based on the user input, writing in the secure element, and associating, by the application of the mobile device, the at least one usage rule with the proxy credit card information, wherein the at least one usage rule limits use of the proxy credit card information to the merchant or payee;

communicating, by the mobile device over a wireless network to an issuer server associated with the original credit card information in response to the generating and the creating, an indication that the proxy credit card information was created in the secure element and communicating the at least one usage rule created in the secure element, wherein the mobile device communicates with the issuer server independent from the computer system of the merchant or payee;

receiving, by the issuer server, the indication from the mobile device;

in response to the issuer server receiving the indication from the mobile device, generating, by the issuer server independently executing an issuer server algorithm, the same proxy credit card information based on the original credit card information independently of the mobile device generating the proxy credit card information, wherein the mobile device algorithm and the issuer server algorithm are the same algorithm stored and executed on different devices;

associating, by the issuer server, the independently generated proxy credit card information with a user corresponding to the original credit card information;

providing, by the application of the mobile device, the proxy credit card information generated in the secure element to the computer system associated with the merchant or payee for payment in the transaction;

receiving, by the issuer server from the computer system of the merchant or payee, the proxy credit card information that was provided to the computer system of the merchant or payee from the mobile device;

using, by the issuer server, the independently generated proxy credit card information to determine that the proxy credit card information generated by the mobile device is the same as the independently generated proxy credit card information based on the association;

enforcing, by the issuer server, the at least one usage rule received from the mobile device by determining that the transaction is in conformance with the at least one usage rule;

verifying, by the issuer server, the transaction based on the determination, by the issuer server, that the proxy credit card information generated by the mobile device is the same as the independently generated proxy credit card information and based on the determination, by the issuer server, that the transaction is in conformance with the at least one usage rule; and completing, by using the proxy credit card information provided to the computer system of the merchant or payee from the mobile device, the transaction based at least on the determination, by the issuer server, that the proxy credit card information generated by the mobile device is the same as the independently generated proxy credit card information by the issuer server and based at least on the determination, by the issuer server, that the transaction is in conformance with the at least one usage rule.

2. The method of claim 1, wherein the at least one usage rule further comprises one of: a purchase amount limit, a maximum number of uses limit of the proxy credit card information with the merchant or payee, a maximum frequency of use limit allowed, or a time limit.

3. The method of claim 1, wherein the at least one usage rule is stored in the non-transitory memory after being created based on the user input.

4. The method of claim 1, further comprising determining, by the application on the mobile device, that the proxy credit card information complies with Luhn's algorithm prior to providing the proxy credit card information to the computer system.

5. The method of claim 4, wherein providing the proxy credit card information feeds the proxy credit card information to the computer system via a communicative coupling with the mobile device.

6. The method of claim 1, wherein providing the proxy credit card information presents at least a portion of the proxy credit card information on a display of the mobile device.

7. A method of completing a transaction using proxy credit card information comprising:
   initiating, via a mobile device, a transaction with an interface communicatively coupled to a computer system associated with a merchant or payee;
   creating, in a secure element comprising a non-transitory memory of the mobile device, proxy credit card information using an application on the mobile device executing a mobile device algorithm, wherein creating the proxy credit card information is based on original credit card information, wherein the proxy credit card information comprises a proxy credit card number that is different from the original credit card information, and wherein the secure element comprises a chip embedded on the mobile device that provides security during the transaction;
   receiving, via an interface on the mobile device, user input which defines at least one usage rule that specifies at least one of a purchase amount limit, a number of uses limit, and a frequency of use limit;
   based on the user input, creating, in the secure element by executing the application of the mobile device, the at least one usage rule associated with use of the proxy credit card information in response to creating the proxy credit card information by the mobile device;
   storing, in the secure element of the mobile device, the proxy credit card information based on the at least one usage rule;
   communicating, via the mobile device to an issuer server associated with the original credit card information, the at least one usage rule created in the secure element and communicating an indication that the proxy credit card information was created using the secure element of the mobile device;
   receiving, by the issuer server, the indication from the mobile device;
   in response to the issuer server receiving the indication from the mobile device, generating, by the issuer server independently executing an issuer server algorithm, the same proxy credit card information based on the original credit card information independently of the mobile device generating the proxy credit card information, wherein the mobile device algorithm and the issuer server algorithm are the same algorithm stored and executed on different devices;
   associating, by the issuer server, the independently generated proxy credit card information with a user corresponding to the original credit card information;
   sending, from the mobile device, the proxy credit card information to the computer system of the merchant or payee;
   subsequent to the proxy credit card information being sent to the computer system of the merchant or payee, receiving, by the issuer server from the computer system of the merchant or payee, the proxy credit card information that was provided to the computer system of the merchant or payee from the mobile device;
   using, by the issuer server, the independently generated proxy credit card information to determine that the proxy credit card information generated by the mobile device is the same as the independently generated proxy credit card information based on the association;
   enforcing, by the issuer server, the at least one usage rule received from the mobile device by determining that the transaction is in conformance with the at least one usage rule;
   verifying, by the issuer server, the transaction based on the determination, by the issuer server, that the proxy credit card information generated by the mobile device is the same as the independently generated proxy credit card information and based on the determination, by the issuer server, that the transaction is in conformance with the at least one usage rule; and
   completing, by using the proxy credit card information provided to the computer system of the merchant or payee from the mobile device, the transaction based at least on the determination, by the issuer server, that the proxy credit card information generated by the mobile device is the same as the independently generated proxy credit card information and based at least on the determination, by the issuer server, that the transaction is in conformance with the at least one usage rule.

8. The method of claim 7, wherein the transaction is completed at least in part via the proxy credit card information created on the mobile device without the mobile device or the issuer server communicating all the original credit card information to the computer system of the merchant or payee.

9. The method of claim 8, wherein completing the transaction comprises sending the proxy credit card information via the interface to the computer system associated with merchant or payee.

10. The method of claim 8, further comprising inputting, via the secure element of the mobile device, the proxy credit card information into the interface, and wherein the transaction is an online transaction.

11. The method of claim 7, wherein the at least one usage rule comprises a merchant specification, wherein the merchant specification is a data structure that defines a limitation for use of the proxy credit card information with a type of merchant or payee.

12. A method for creating proxy credit card information comprising:
   accessing, by executing an application that configures a processor of a mobile device, original credit card information stored in a secure element on the mobile device, wherein the secure element comprises a chip embedded on the mobile device that provides security during a transaction;
   generating, in the secure element using the application of the mobile device executing a mobile device algorithm, proxy credit card information based on the original credit card information;
   receiving, on an interface of the mobile device, user input defining at least one usage rule that limits use of the proxy credit card information;
   in response to generating the proxy credit card information on the mobile device and receiving the user input defining the at least one usage rule, creating, by the mobile device in the secure element, the at least one usage rule associated with use of the proxy credit card information, wherein the proxy credit card information comprises a proxy credit card number and at least one of a name, an expiration date, a security code, or issuer information associated with the original credit card information;

communicating, by the mobile device to an issuer server associated with the original credit card information, an indication message comprising an indication that the proxy credit card information was generated in the secure element of the mobile device and communicating the at least one usage rule created in the secure element, wherein the mobile device communicates with the issuer server independent from a computer system of the merchant or payee;

receiving, by the issuer server, the indication from the mobile device;

in response to the issuer server receiving the indication from the mobile device, generating, by the issuer server independently executing an issuer server algorithm, the same proxy credit card information based on the original credit card information independently of the mobile device generating the proxy credit card information, wherein the mobile device algorithm and the issuer server algorithm are the same algorithm stored and executed on different devices;

associating, by the issuer server, the independently generated proxy credit card information with a user corresponding to the original credit card information;

providing, by the mobile device, the proxy credit card information generated in the secure element to the computer system of the merchant or payee for payment in the transaction;

receiving, by the issuer server from the computer system of the merchant or payee, the proxy credit card information that was provided to the computer system of the merchant or payee from the mobile device;

using, by the issuer server, the independently generated proxy credit card information to determine that the proxy credit card information generated by the mobile device is the same as the independently generated proxy credit card information based on the association;

enforcing, by the issuer server, the at least one usage rule received from the mobile device by determining that the transaction is in conformance with the at least one usage rule;

verifying, by the issuer server, the transaction based on the determination, by the issuer server, that the proxy credit card information generated by the mobile device is the same as the independently generated proxy credit card information and based on the determination, by the issuer server, that the transaction is in conformance with the at least one usage rule; and completing, by using the proxy credit card information provided to the computer system of the merchant or payee from the mobile device, the transaction based at least on the determination, by the issuer server, that the proxy credit card information generated by the mobile device is the same as the independently generated proxy credit card information and based at least on the determination, by the issuer server, that the transaction is in conformance with the at least one usage rule.

13. The method of claim 12, further comprising, subsequent to the generating proxy credit card information, determining, by the mobile device in the secure element, that the proxy credit card information complies with Luhn's algorithm.

14. The method of claim 12, wherein the at least one usage rule is created in the secure element based on user input.

15. The method of claim 12, wherein the at least one usage rule comprises one of: a purchase amount limit, a number of uses limit, a frequency of use limit, a time limit, a merchant specification, a type of merchant, or a type of goods purchased.

16. The method of claim 12, wherein a portion of the proxy credit card information remains unchanged from the original credit card information.

* * * * *